United States Patent [19]
Deter

[11] Patent Number: 5,903,304
[45] Date of Patent: May 11, 1999

[54] PROCESS AND DEVICE FOR GENERATING A STEREOSCOPIC VIDEO PICTURE

[75] Inventor: Christhard Deter, Gera, Germany

[73] Assignee: LDT GmbH & Co. Laser-Display Technologie KG, Gera, Germany

[21] Appl. No.: 08/836,241

[22] PCT Filed: Aug. 23, 1996

[86] PCT No.: PCT/EP96/03732

§ 371 Date: Apr. 28, 1997

§ 102(e) Date: Apr. 28, 1997

[87] PCT Pub. No.: WO97/14074

PCT Pub. Date: Apr. 17, 1997

[30] Foreign Application Priority Data

Oct. 6, 1995 [DE] Germany .............. 195 37 356

[51] Int. Cl.⁶ .............. H04N 13/04; H04N 15/00
[52] U.S. Cl. .............. 348/57; 349/15
[58] Field of Search .............. 348/58, 57, 790; 349/15; H04N 13/04, 15/00

[56] References Cited

U.S. PATENT DOCUMENTS

| | | | |
|---|---|---|---|
| 3,569,988 | 3/1971 | Schmidt | 348/57 |
| 4,623,219 | 11/1986 | Trias . | |
| 4,641,178 | 2/1987 | Street . | |
| 4,978,202 | 12/1990 | Yang | 348/196 |
| 5,537,476 | 7/1996 | Coteus et al. . | |

FOREIGN PATENT DOCUMENTS

| | | |
|---|---|---|
| 473343A1 | of 1991 | European Pat. Off. . |
| 4125241 | of 1993 | Germany . |

*Primary Examiner*—Howard Britton
*Attorney, Agent, or Firm*—McAulay Nissen Goldberg Kiel & Hand, LLP

[57] ABSTRACT

In a process for generating a stereoscopic video picture by using partial images for the left eye and the right eye of an observer, which partial images emit light with different polarization states oriented orthogonally relative to one another, wherein the observer perceives the stereoscopic video picture through spectacles with eyepieces which filter the respective polarization state of the light. At least one light source is used for generating every partial image. This light source emits a substantially parallel, polarized light bundle which can be controlled with respect to intensity and whose polarization state is identical to one of the two orthogonal polarization states or can be converted into this polarization state with low loss and is raster-scanned on a screen to generate at least one partial image. A corresponding device comprises at least one light source which emits a polarized, substantially parallel light bundle which is controllable with respect to intensity and at least one raster scanning device for the left-to-right, top-to-bottom, line-by-line deflection of the light bundle on a screen for displaying at least one of the two partial images.

14 Claims, 2 Drawing Sheets

PROCESS AND DEVICE FOR GENERATING A STEREOSCOPIC VIDEO PICTURE

BACKGROUND OF THE INVENTION a) Field of the Invention

The invention is directed to a process for generating a stereoscopic video picture by means of partial images for the left eye and for the right eye of an observer, these partial images emitting light with different polarization states oriented orthogonally relative to one another, wherein the observer perceives the stereoscopic video picture through spectacles with eyepieces which filter the respective polarization state of the light. The invention is further directed to a device for generating a stereoscopic video picture by means of partial images for the left eye and for the right eye of an observer, these partial images emitting light with different polarization states oriented orthogonally relative to one another, wherein the observer perceives the stereoscopic video picture through spectacles with two eyepieces which filter the respective polarization state of the light.

b) Description of the Related Art

The representation of three-dimensional images is desired for the future development of video technology not only because of increased entertainment value in television, but also because three-dimensional pictures can be used as design aids in computer aided design, since the designed element can be observed directly and two-dimensional views with auxiliary lines for hidden edges are dispensed with.

There are essentially two methods to be distinguished in the known prior art for representing three-dimensional video pictures. In the first method, the three-dimensional pictures are imaged as plane sectional images in a plurality of planes arranged one behind the other. The second method makes use of the fact that an observer only recognizes a three-dimensional picture in that he observes an object through both eyes from different viewing angles. By using this second method (stereoscopy, as it is called), two pictures detected from different viewing angles are presented to the left eye or right eye so that the object shown on the pictures is perceived three-dimensionally by the observer's brain as is customary in normal vision. The stereoscopic process uses special spectacles which filter the two pictures out of an overall picture and present these pictures to the left eye or right eye of the observer.

The imaging of three-dimensional pictures in a plurality of picture planes in accordance with the first method is described in WO 79/00308 A1 and EP 0 311 843 A2. Special spectacles are not used in this type of image generation. However, three-dimensional pictures shown in this way require a substantially greater amount of information than would be required for the transmission of only two pictures separately for the left eye and right eye. Therefore, it is not expected that these devices will be put to general use in video and television technology in the near future.

The second method, that of generating stereoscopic images, is also used in the process and device mentioned in the introduction. Two partial images are generated with different polarization states orthogonal to one another and are superimposed. Spectacles worn by the observer then filter out the partial image for the left eye and the partial image for the right eye via polarizing filters.

Processes and devices of this type are known from DE 39 10 420 A1, EP 0 328 357 A2, DE 36 07 629 C2, DE 32 01 837 A1, and DE 32 14 327 A1. In order to represent two pictures, one for each eye of the observer, picture tubes are used as is conventional in television technology. By means of polarizing filters located in front of a picture tube, the polarization of the image emanating from the light, depending upon the partial image represented, is either changed alternately or partial images generated on two picture tubes are projected upon one another after filtering the picture with different polarization. The observer wears spectacles with two polarizing filters filtering out different polarization states; the polarizing filters allow one of the partial images to pass through for each eye. If two partial images are taken by different cameras spaced apart at a defined distance, for example, this results in a stereoscopic image for the observer.

However, using polarizing filters in the spectacles and acting upon the superposed partial images with additional polarization leads to energy losses which must be taken into account in generating pictures. In very large-picture screen surfaces, the increased energy necessitated by this loss can result in heat problems requiring cooling. Thus, the undesirably high energy consumption is compounded by increased constructional expense.

In accordance with DE 31 34 649 A1, DE 32 26 703 A1, EP 0 076 015 A1, EP 0253 121 A2 and WO 80/1447 A1, the two pictures are represented in different colors for the left eye and right eye. Spectacles provide for the selection of the pictures generated for the left eye and right eye by means of color filters. Large energy losses are also inevitable when filtering out colors.

In addition to the large intensity losses caused by color filters, this technique also has the disadvantage that high-quality stereoscopic color pictures are rendered impossible because the color information already in use for allocating the pictures to the respective eyes is thus not fully available for showing colors.

Another device (DE 37 29 521 A1) does not need to use polarized light because the partial images for the left eye and right eye are generated in alternating cycles, wherein the information for the left eye and right eye is screened out synchronously with the presentation of the corresponding partial image with the aid of spectacles. This technique would appear suitable for reducing energy losses compared with the prior art indicated above. However, this assumption has proved wrong in practice. Because of the rapidity of the observer's eye, the switching frequencies for opening and closing the shutters contained in the spectacles must be very high. Moreover, in order to avoid possible disturbing noise which is to be expected in the mechanical execution of this shutter mechanism, only LCD arrays can be used as shutters in practice. However, these LCD arrays also pass only a small portion of the light and thus likewise result in large energy losses.

This technique using spectacles provided with shutters was used in connection with film projection for the Sony Theater in Lincoln Square, New York ("SPIEGEL", no. 48, 1994, page 213). Although this method of cinematic projection uses low-loss 15,000-watt xenon lamps such as those developed by NASA for illuminating nighttime space launches, large individual pictures must be used for projection so that the thermal loading of the film remains within acceptable ranges. The article cited above mentions that rolls of film can only be changed with forklifts. This example is a particularly clear illustration of the large energy requirement especially in stereoscopic large-picture representation in accordance with the present state of the art and the resulting impractical handling.

Further, this technique has the disadvantage that a signal must be fed to the shutter-controlled spectacles in order to open the shutter in front of the respective eye. The only alternative to an unmanageable wiring of the spectacles is a remote control, e.g., via infrared light, which sharply increases the cost per set of spectacles.

Arrangements for generating stereoscopic video pictures in which two pictures are presented directly to both eyes are described in DE 34 21 652 A1, DE 31 34 646 A1, EP 0 282 955 A1, EP 0336 628 A1, EP 0262 955 A1, WO 83/02706 A1, and WO 84/01680 A1. These arrangements either use special spectacles in which two stereoscopic partial images are sent to the eyes via prisms or mirrors or the partial images are generated directly by small monitor tubes in the spectacles for each eye.

DE 31 40 404 A1 discloses a projection and recording apparatus in which two pictures are written on different LCD arrays by an individual laser beam making use of the two polarization states of the laser beam and can be projected in a superimposed manner by light from different light sources. Arranged in the path of the laser beam is a controllable polarizing device which passes the light of one polarizing device or the other, depending upon the picture to be written. Although this reference teaches the recording and/or projection of two pictures, the person skilled in the art will not make use of this teaching to generate stereoscopic video pictures, because at least two light sources must be used to display only one picture and also because a large portion of the energy of the two utilized light sources is converted into heat either at the polarizer or at the LCD arrays.

OBJECT AND SUMMARY OF THE INVENTION

It is the primary object of the invention to provide a process for generating stereoscopic video pictures and a corresponding device which make it possible to generate stereoscopic pictures economically and with particularly low energy losses.

This object is met in a process of the type mentioned above in that at least one light source is used for generating every partial image, this light source emitting a substantially parallel, polarized light bundle which can be controlled with respect to intensity and whose polarization state is identical to one of the two orthogonal polarization states or can be converted into this polarization state with no losses and which is raster-scanned on a screen to generate at least one partial image.

The invention thus uses differently polarized light for the two partial images, but, in so doing, makes use of already polarized light sources so as to reduce energy losses to virtually nil.

The invention does riot make use of TV picture tubes for displaying the picture; due to the direct use of light for picture display instead of the conversion of electron beams into light on a screen, the energy losses resulting from such conversion can also be avoided.

The process according to the invention can be carried out, for example, in that two partial images are generated on a screen separately for each eye by polarized light sources. To reduce the cost required for this process, a preferred further development of the process according to the invention provides that the same, at least one, light source is used for both partial images, but the light bundle is switched periodically into one of the polarization states orthogonal to one another, so that only one light source is needed for both partial images.

In accordance with another advantageous further development of the process according to the invention, switching between the two polarization states which are orthogonal to one another is effected after the light source and before raster scanning, with reference to the light propagation. In this way, the scan of the light bundle can be carried out for both partial images by means of an individual raster scanning device. This feature thus advantageously enables the process according to the invention to be carried out particularly economically, wherein the energy losses caused by the individual raster scanning device turn out to be very low.

The device according to the invention for carrying out the process according to the invention is based on a device of the type mentioned in the introduction and is characterized by at least one light source which emits a polarized, substantially parallel light bundle which is controllable with respect to intensity and at least one raster scanning device for the left-to-right, top-to-bottom, line-by-line deflection of the light bundle on a screen for displaying at least one of the two partial images.

The device according to the invention serves to generate a video picture by picture points whose intensity is controlled via the light source, wherein the raster scanning device effects the left-to-right, top-to-bottom, line-by-line scan of the light beam on the screen. The picture points are accordingly illuminated in sequence as in television picture tubes in television technology, but the raster scanning is effected in this instance by the deflection of a light bundle. As is known from the prior art, such raster scanning devices use rotating polygon mirrors, swivel mirrors and acoustooptical modulators.

According to a preferred further development of the device according to the invention, the at least one light source is a laser which emits polarized light bundles, in particular a gas laser, solid-state laser or diode laser.

In commercially available lasers, polarization of the emitted light is also carried out for mode selection. As a result of the stimulated emission of atoms of the laser medium excited in lasers, the emitted light quanta are coupled in with the same phase as the exciting light source. For example, if the mode selection is provided by a linear polarization which can be represented by two left-handed and right-handed circulating exciting waves which are coupled in phase, the left-handed and right-handed rotating quanta in the laser medium are excited in phase and emitted in such a way that all states are combined in the same phase with linearly polarized light. All of the energy stored in the laser medium is combined in an individual light bundle of defined energy so that energy losses due to quanta with unwanted polarization are negligible. All of the energy available in the laser medium at the laser frequency is thus combined in a light bundle with a very high degree of polarization.

Further, in comparison with other light sources, lasers have the advantage of a very good parallelism of the generated light bundle. This enables a sharp imaging of the picture points of the video picture without the need of additional parallel-making optics and intensity-reducing shutters. This not only simplifies construction, but avoids the energy losses caused by shutters.

Gas lasers of simple construction achieving degrees of polarization in the order of magnitude of 100:1 have proven suitable in experimental arrangements. Such gas lasers are operated in continuous-wave operation for generating video pictures and are intensity-controlled by means of additional modulators. Modulators which can be used in this technical application control the intensity by means of polarization. This further increases the degree of polarization. In an embodiment example, light bundles with a polarization degree of $10^4$:1 were achieved following the modulators. This high polarization is far more than sufficient for the stereoscopic presentation of video pictures.

As was already mentioned, polarization states which are orthogonal to one another are associated with the two partial images. It is not important whether or not both polarization states are polarized circularly or linearly relative to one another or whether other elliptical states are employed.

In an advantageous further development of the device according to the invention, the light source emits linearly polarized light. When this light source is a laser, the complete emission of the photons in all states of the laser medium in the linear polarization state results in an excellent use of energy. In terms of energy, linear polarization offers still other advantages. For example, since the intensities of three light sources are mixed in color televisions, combining the colored light bundles requires an optical system which, for instance, contains mirrors. However, as is stated by Brewster's law, reflections may be dependent upon the polarization of light, so that a loss of intensity must generally be taken into account in the case of elliptical polarization. Linear polarization is distinguished in that the mirrors can be so arranged that only insubstantial losses occur as a result of incomplete reflection.

Of course, the linearly polarized light bundle on the input side does not necessarily require a linear polarization effect for the spectacle eyepieces, since linearly polarized light can be transformed into circularly polarized or elliptically polarized light by means of known optical components such as Fresnel-type parallelepipeds without a substantial loss in intensity by phase displacement of a polarization component.

In another preferred further development of the invention, the same light sources and the same raster scanning device are used to generate the two partial images. For this purpose, a polarization changing device is provided in the beam path of the light bundle, by means of which the polarization of the light bundle can be switched into one or the other orthogonal polarization state. A further reduction in cost is achieved in this way since the quantity of light sources and raster scanning devices is halved compared with apparatus generating the two partial images by means of different light sources and raster scanning devices.

In principle, the polarization changing device could be arranged at any location through which the beam bundle passes. However, in a preferred further development of the invention, the polarization changing device is arranged between the light source and the raster scanning device, that is, in front of and not behind the raster scanning device, at a location where the light bundle still has a very limited extent. This has the advantage, compared with a possible arrangement behind the raster scanning device, that it obviates additional optics for focussing in the polarization changing device and for compensating for possible beam expansion behind the polarization changing device.

A further advantage consists in that the necessary width of the polarization changing device is still very small at this location where the light bundle is not yet expanded through the raster device. When the Kerr effect or the Pockels effect is used for rotating the polarization direction, for example, only small voltages are needed for changing the polarization to achieve a suitable field strength. For this reason, the circuitry used for applying the polarization state is also economical in this further development.

In accordance with another advantageous development of the invention, the light source is designed for generating linearly polarized light and the polarization changing device is a Pockels cell in which the polarization plane of the transmitted light is rotated when voltage is applied. Rapid changes in polarization are possible in electrically controlled components of this type which work with rotation of the linear polarization state with the use of voltage. Also, there is no risk of intensity losses due to the single rotation of the polarization state.

In accordance with another advantageous further development of the device according to the invention, this device has a plurality of light sources with different wavelengths and a plurality of polarization devices are provided, namely, one for the light of each wavelength. Accordingly, color stereoscopic video pictures can also be generated in a simple manner. Due to the fact that an individual polarization changing device is provided for every wavelength, it is also possible to use polarization changing devices which are extremely dependent on wavelength.

In another preferred further development of the invention with a plurality of light sources, the light exiting from the polarization changing devices is combined by a device to form a common light bundle which is then imaged on the screen by the raster scanning device. This advantageously reduces outlay for synchronization and additional, mechanically complicated raster scanning devices. The device for combining the different light bundles in a common light bundle can be a mirror system, for example.

In the following, the invention is described more fully by way of example with reference to the drawings.

DESCRIPTION OF THE PREFERRED EMBODIMENTS

Figure 1:
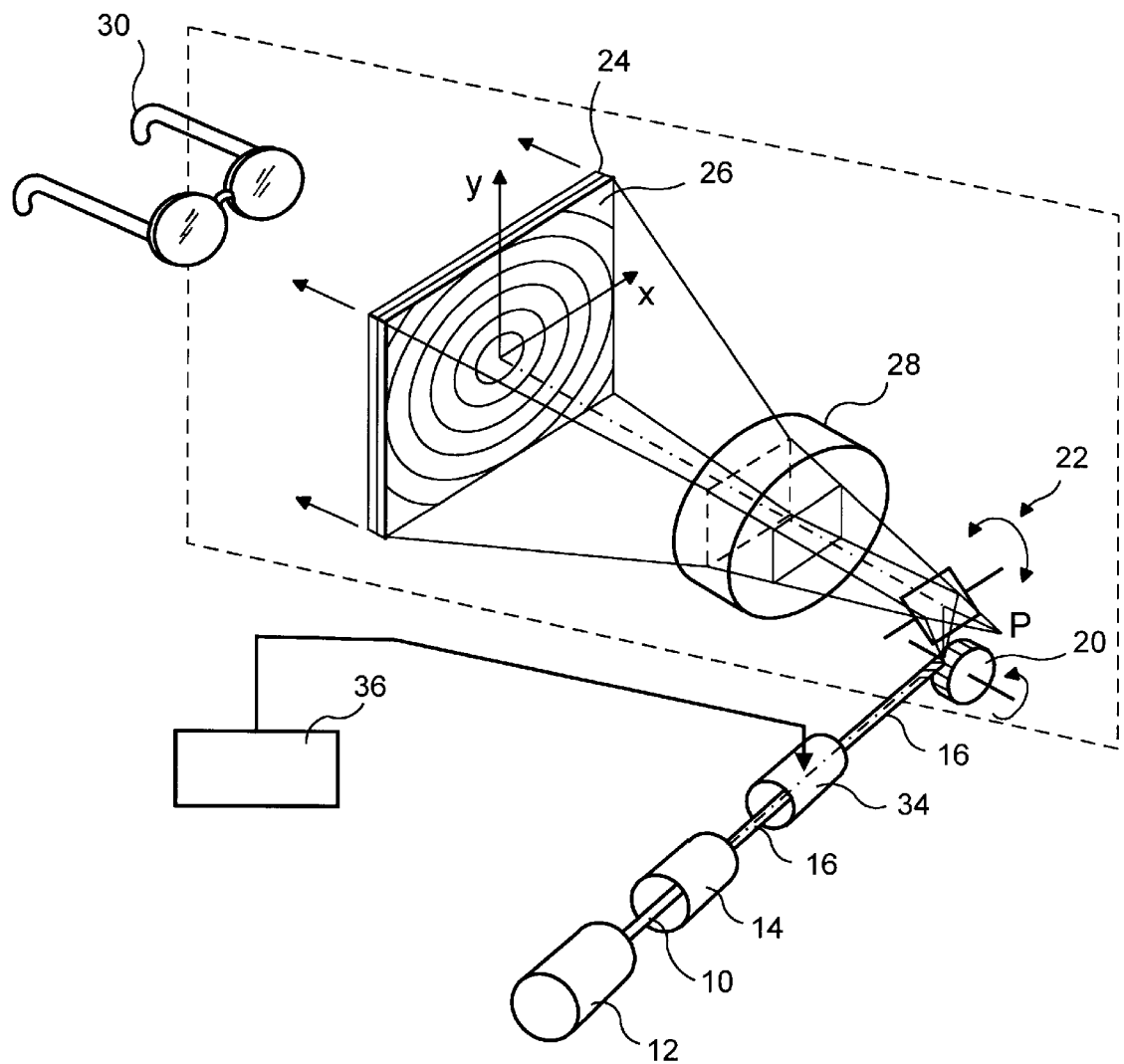
FIG. 1 shows an embodiment example for a device according to the invention for generating stereoscopic video pictures.

In the device, shown in FIG. 1, for generating a stereoscopic video picture, a primary light bundle 10 for imaging is generated by means of a light source 12. This light source 12 is a gas laser operated in continuous-wave operation. This gas laser emits linearly polarized light.

A polarizer 14, e.g., model EOM 3079 available from the firm of Dipl. Ing. Eckhardt Döhrer, Ettlinger Straβe 5, 7516 Karlsbad, is used to modulate the light bundle 10 with the brightness information of picture points for displaying a video picture.

The operation of this polarizer 14 is based on the Pockels effect. When voltage is applied, the linear polarization plane of the primary light bundle 10 emerging from the light source 12 is rotated. A polarizing filter which passes only a linear polarization plane is arranged at the output of the polarizer 14. As a result, the light bundle 16 emerging from the polarizer 14 is acted upon with varying intensity depending upon the voltage applied to the polarizer 14 and can accordingly be modulated.

Further, a rotating mirror 20 and a swiveling mirror 22 are arranged in the beam path of the light bundle 16 and deflect the light bundle 16 in the horizontal and vertical direction onto a screen 24. Accordingly, a video picture is produced in a known manner on the screen 24 which can be observed by an observer in the direction of the arrows shown in the figure.

Also provided are a Fresnel lens 26 and an optical system 28 which serve to expand the beam deflected in a raster pattern via the mirrors 20 and 22 for a larger screen surface of the screen 24 and to deflect the light impinging at a large angle to the Fresnel lens 26 in the direction of the observer again so that the screen 24 is illuminated evenly from the perspective of the observer.

As was already mentioned in the introduction, a stereo picture can be generated when different stereoscopically recorded partial images with the light of two polarization states orthogonal to one another are displayed for the left eye and right eye of the observer. The separation of the two partial images for the left eye and right eye is effected by means of spectacles 30 in which the left eyepiece and the right eyepiece pass only one of the two orthogonal polarization states, respectively.

Due to the polarized light source 12 and the polarizer 14, the light bundle 16 is already polarized. Thus, two partial images with two polarization directions adapted to the eyepieces of the spectacles 30 can be generated by two such raster scanning devices and two light sources 12, so that an observer sees a stereoscopic picture through these spectacles 30.

However, a less costly path has been taken in the embodiment example. The same light source 12 with modulator 14 and the raster scanning device formed of a rotating mirror 20 and a swiveling mirror 22 are used for both partial images and the polarization of the light bundle 16 impinging in the raster scanning device is reversed periodically. In so doing, the modulation of the light bundle is effected in dependence on the polarization of the light bundle 16, depending on whether the partial image for the left eye or the partial image for the right eye is to be generated on the screen 24.

A polarization changing device 34 is provided for changing the polarization. This polarization changing device 34 is formed of the same Pockels cell as was used for the modulator 14, but without the polarizing filter at the output of the modulator in the polarization changing device 34.

Due to the Pockels effect, the polarization changing device 34 rotates only the polarization of the incident linearly polarized light beam. For a quick change of polarization with respect to the first partial image and second partial image, the position changing device 34 is acted upon by rectangular waves by means of a control device 36 so that the polarization for the first partial image is passed during half of the period of the rectangular wave and the polarization for the second partial image is passed during the other half. In this connection, the light bundle 16 is modulated synchronously with the rectangular wave with respect to the first partial image and second partial image.

The described embodiment example works with an individual light source 12 constructed as a laser, which does not permit color display.

However, stereoscopic color pictures can also be generated when using three lasers with different wavelengths for three colors.

The simplest possibility consists in substituting three light sources of different wavelengths for the light source 12, wherein the light beams are combined in a common parallel bundle of beams by mirrors, for example, as is known in the prior art. However, difficulties may arise in this connection, depending on the type of position changing device 34, if the generated polarization change is wavelength-dependent.

Figure 2:
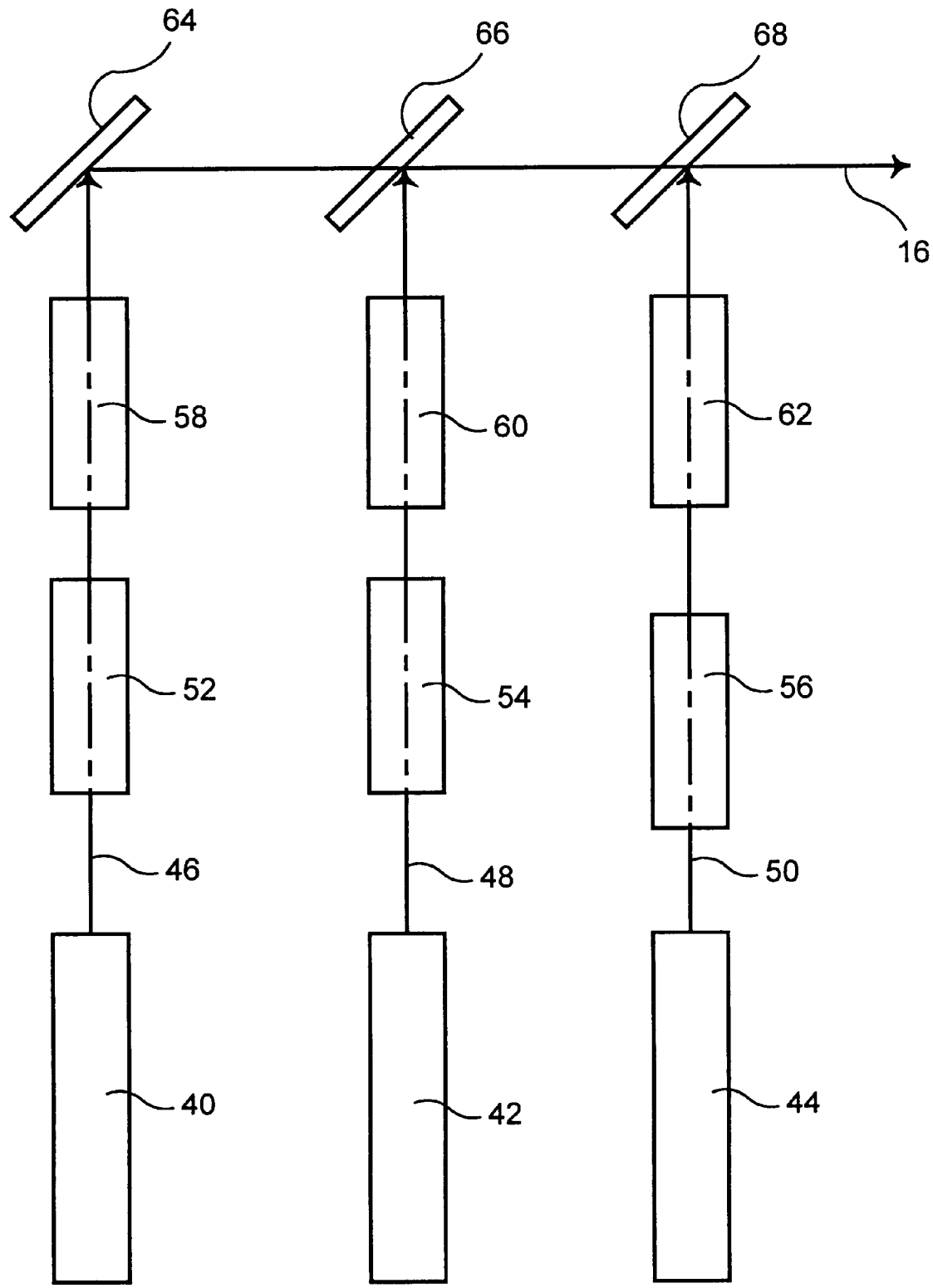
FIG. 2 shows an arrangement of light sources and polarizers for another embodiment example of a device according to the invention.

A particularly economical beam guiding arrangement for three light sources 40, 42, 44 for which lasers can be used is described in the following with reference to FIG. 2. The generated bundles of light beams 46, 48, 50 are again fed to modulators 52, 54, 56 for controlling intensity. Every modulated light bundle is then guided through a polarization changing device 58, 60, 62. In these polarization changing devices, the polarization is controlled in the same way for generating the stereoscopic partial images, and the light intensity is controlled synchronously for the first and second partial images as was already described above with respect to the polarization changing device 34.

After passing through the polarization changing devices 58, 60, 62, the light bundles are combined into a common light bundle 16 by means of a mirror system comprising mirrors 64, 66 and 68. This common light bundle 16 is imaged in a raster pattern on the screen 24 as a video picture as was shown with reference to FIG. 1.

The mirrors 64, 66 and 68 can be dichroitic mirrors, although it should be noted when arranging the latter that the reflection behavior and transmitting behavior of such mirrors is generally polarization-dependent. Dielectric mirrors are also especially suitable. These dielectric mirrors can be designed so as to be totally reflecting or totally transmitting for determined wavelengths based on interference at thin layers of reflected or transmitted partial beams. The dimensioning of these layers and the selection of material for the layers will be familiar to the person knowledgeable in the field of optics, especially as applied in dielectric coating of lenses.

The described embodiment examples show a simple video system for stereoscopic video pictures which is also especially suited for stereoscopic large-screen projection when the distance between the screen 24 and the scanning device is sufficiently great and/or the optical system 28 is correspondingly arranged.

While the foregoing description and drawings represent the preferred embodiments of the present invention, it will be obvious to those skilled in the art that various changes and modifications may be made therein without departing from the true spirit and scope of the present invention.

What is claimed is:

1. In a process for generating a stereoscopic video picture by means of partial images for the left eye and the right eye of an observer, such partial images emitting light with different polarization states oriented orthogonally relative to one another, wherein the observer perceives the stereoscopic video picture through spectacles with eyepieces which filter the respective polarization state of the light, the process further comprising the steps of:

using a plurality of light sources for generating every partial image, said light sources emitting a substantially parallel, polarized light bundle which can be controlled with respect to intensity and whose polarization state is identical to one of the two orthogonal polarization states or can be converted into this polarization state with low loss and which is raster-scanned on a screen to generate at least one partial image;

combining the plurality of light sources to produce a combined light bundle; and changing the polarization of the combined light bundle to one of said two orthogonal polarization states prior to raster-scanning the combined light bundle on said screen.

2. The process according to claim 1, including the steps of using the same plurality of light sources for both partial images, and switching said combined light bundle periodically into one of the two orthogonal polarization states.

3. The process according to claim 2, including the step of effecting switching between the two polarization states which are orthogonal to one another after the light source and before the raster scanning, with reference to the light propagation.

4. A device for generating a stereoscopic video picture by means of two partial images for the left eye and for the right eye of an observer, such partial images emitting light with different polarization states which are orthogonal to one another, wherein the observer perceives the stereoscopic video picture through spectacles with two eyepieces which filter the respective polarization state of the light, the device further comprising:

- a plurality of light sources for emitting a polarized, substantially parallel light bundle which is controllable with respect to intensity;
- means for combining the plurality of light sources to produce a combined light bundle;
- means for changing the polarization of the combined light bundle to one of said two orthogonal polarization states; and
- at least one raster scanning device for the left-to-right, top-to-bottom, line-by-line deflection of the combined light bundle on a screen for displaying at least one of the two partial images.

5. The device according to claim 4, wherein the light sources emit linearly polarized light.

6. The device according to claim 4, wherein a plurality of light sources is provided with different wavelengths and wherein a polarization changing device is provided for the light of each wavelength.

7. The device according to claim 6, wherein a device is provided for combining the light emerging from the polarization changing devices into a common light bundle which is then imaged on the screen by the raster scanning device.

8. The device according to claim 4, wherein the same plurality of light sources and the same raster scanning device are provided for generating the two partial images, and a polarization changing device is provided in the beam path of the light bundle, by means of which the polarization of the light bundle can be switched into one or the other orthogonal polarization state.

9. The device according to claim 8, wherein the polarization changing device is arranged between the light sources and the raster scanning device.

10. The device according to claim 8, wherein the light sources are designed for generating linearly polarized light and the polarization changing device is a Pockels cell in which the polarization plane of the transmitted light is rotated when voltage is applied.

11. The device according to claim 4, wherein each of said plurality of light sources is a laser emitting a polarized light bundle.

12. The device according to claim 11, wherein each of said lasers is a gas laser.

13. The device according to claim 11, wherein each of said lasers is a solid state device.

14. The device according to claim 11, wherein each of said lasers is a diode laser.

* * * * *